United States Patent
Liao

(10) Patent No.: US 10,279,863 B2
(45) Date of Patent: May 7, 2019

(54) DOUBLE CLAMP CLIPLESS PEDAL

(71) Applicant: RQ Inc., Santa Barbara, CA (US)

(72) Inventor: Jordan Liao, Santa Barbara, CA (US)

(73) Assignee: RQ INC., Santa Barbara, CA (US)

( * ) Notice: Subject to any disclaimer, the term of this patent is extended or adjusted under 35 U.S.C. 154(b) by 0 days.

(21) Appl. No.: 15/073,194

(22) Filed: Mar. 17, 2016

(65) Prior Publication Data

US 2017/0267312 A1 Sep. 21, 2017

(51) Int. Cl.
  *B62M 3/08* (2006.01)
(52) U.S. Cl.
  CPC .................... *B62M 3/086* (2013.01)
(58) Field of Classification Search
  CPC ........ B62M 3/08; B62M 3/083; B62M 3/086; B62M 3/10
  See application file for complete search history.

(56) References Cited

U.S. PATENT DOCUMENTS

| | | | | |
|---|---|---|---|---|
| 5,003,841 A | * | 4/1991 | Nagano | B62M 3/08 |
| | | | | 74/594.4 |
| 5,115,692 A | * | 5/1992 | Nagano | B62M 3/086 |
| | | | | 280/11.31 |
| 6,425,304 B1 | * | 7/2002 | Bryne | B62M 3/086 |
| | | | | 36/131 |
| 7,322,259 B2 | * | 1/2008 | De Bast | B62M 3/086 |
| | | | | 36/131 |
| 7,743,682 B2 | * | 6/2010 | Couturet | B62M 3/086 |
| | | | | 74/594.6 |
| 8,752,453 B2 | * | 6/2014 | Plassiard | B62M 3/086 |
| | | | | 74/594.4 |
| 9,056,652 B2 | * | 6/2015 | Inoue | B62M 3/086 |
| 9,493,209 B2 | * | 11/2016 | Sakaue | B62M 3/086 |
| 2006/0070489 A1 | * | 4/2006 | Chen | B62M 3/086 |
| | | | | 74/594.6 |
| 2012/0167711 A1 | * | 7/2012 | Hsieh | B62M 3/086 |
| | | | | 74/594.6 |

FOREIGN PATENT DOCUMENTS

| | | | | | |
|---|---|---|---|---|---|
| DE | 202016104639 | * | 9/2016 | ............ | B62M 3/086 |
| FR | 2809701 A1 | * | 12/2001 | ............ | B62M 3/086 |
| FR | 2822127 A1 | * | 9/2002 | ............ | B62M 3/086 |
| FR | 3008675 B3 | * | 10/2015 | ............ | B62M 3/086 |
| TW | M392140 U1 | | 11/2010 | | |
| TW | I369321 B1 | | 8/2012 | | |

* cited by examiner

*Primary Examiner* — Adam D Rogers
(74) *Attorney, Agent, or Firm* — Muncy, Geissler, Olds & Lowe, P.C.

(57) ABSTRACT

A double clamp clipless pedal includes a pedal body, a main shaft, and a clamp assembly. The pedal body has a first surface and a second surface. The clamp assembly is provided with a front clamp and a rear clamp rotatably disposed on two sides of the main shaft, such that the front clamp and the second clamp permanently rotate toward the main shaft for engaging a shoe cleat. The front clamp and the rear clamp are allowed to automatically swing together with the shoe cleat movement for maintaining the engagement. The front and rear clamps are able to resiliently and rotationally open, whereby the shoe cleat is easily clamped and disclamped by the front and rear clamps.

10 Claims, 7 Drawing Sheets

DOUBLE CLAMP CLIPLESS PEDAL

BACKGROUND OF THE INVENTION

1. Field of the Invention

The present invention relates to clipless pedals, and more particularly, to a clipless pedal having the front clamp and the rear clamp allowed to be resiliently rotated for engaging and disengaging the shoe cleat, wherein the front clamp and the rear clamp are able to automatically swing together with the shoe cleat movement in order to maintain the shoe cleat engagement; moreover, the shoe cleat is efficiently engaged and disengaged with the clamps in various manners.

2. Description of the Related Art

As shown by Taiwan patent I369321, a traditional clipless pedal for bicycle provides a rear clamp structure on the rear end of a pedal body, such that the rear end of a shoe cleat is clamped when the shoe cleat is engaged with the clipless pedal. Another traditional clipless pedal, shown by Taiwan patent M392140, has a pedal body having an upper and an lower surface, with a first connecting end and a second connecting end disposed on two sides of the pedal body, respectively, and the upper and lower surfaces are provided with a first clamping assembly and a second clamping assembly, respectively, which is characterized in that the both surfaces have the clamping structures, providing greater convenience of usage against the first traditional clipless pedal. However, the front retaining member is fixed, so the front end of the shoe cleat must be clamped first, with the rear retaining member is then resiliently rotated to open by use of the pedaling force, thus completing the clamping process upon the shoe cleat. As a result, the operation method is invariable, such that the user needs to practice repeatedly in order to master such a specific clamping method.

Further, when the shoe cleat is to be disengaged, the user needs to rotate the shoe and the shoe cleat thereon, whereby the rear clamp is pushed to open, so as to disengage the shoe cleat from the front and rear retaining members. However, with only the rear retaining member being allowed to rotatable move, during the foot circling movement of the user foot, a non-rotational backward force is possibly produced, causing the rear retaining member to be accidentally opened. Therefore, at least one spring having prestressed force is usually provided to such kind of clipless pedal for keeping the rear retaining member to be permanently clamping. User is allowed to increase the prestressed force in order to provide a larger force tolerance to the rear retaining member, so as to prevent the shoe cleat from being accidentally disengaged. Hence, user needs to cast a larger force to engage the shoe cleat between the front and rear retaining members, causing an operational difficult, and the rotating force for disengaging the shoe cleat shall be increased as well. As a result, user may not remove the shoe and the clipless pedal in time in emergency, such that a dangerous situation may thereby occurs.

SUMMARY OF THE INVENTION

For improving the aforementioned issue, a double clamp clipless pedal is disclosed, wherein the front clamp and the rear clamp are allowed to automatically swing together with the shoe cleat movement to keep the shoe cleat engagement; moreover, the shoe cleat is allowed to be efficiently clamped between the front and rear clamps.

A double clamp clipless pedal is provided, comprising: a pedal body, having a first surface and a second surface, and provided with a main shaft passing through the pedal body to be rotationally connected to an end of a crank.

At least one of the first and second surfaces of the pedal body has a clamp assembly. The clamp assembly has a front clamp and a rear clamp disposed on two sides of the main shaft, respectively, wherein each of the front clamp and the rear clamp is rotatably disposed in the pedal body by a rotational shaft, respectively. Each of the front clamp and the rear clamp is provided with at least one resilient member, such that the front clamp and the rear clamp permanently rotate toward the main shaft of the pedal body.

The main objective provided by the present invention is that the shoe cleat at the bottom of a shoe is allowed to be engaged between the front clamp and the rear clamp. When user pedals the bicycle pedal and cast a pedaling force thereupon, the front and rear clamps automatically swing forward/backward together with the shoe cleat movement, such that the shoe cleat remains engaged by the front and rear clamps, so as to prevent the non-rotational force generated during the foot circling movement in the bicycle riding process from accidentally opening the front and rear clamps.

Another objective provided by the present invention is that the clamp assembly has a first clamp assembly and the second clamp assembly forming a shoe cleat fixing mechanism on both the first surface and the second surface. Also, the front clamp and the rear clamp on each surface resiliently and rotationally open or close against each other, facilitating the engagement of the shoe cleat between the front and rear clamps in various manners.

Another objective provided by the present invention is that due to the front and rear clamps automatically moving forward/backward together with the shoe cleat movement, the resilient members of the front and rear clamps need only a small resilient force to provide a sufficient fixing function. Based on the same reason, when the shoe cleat is to be disengaged from the front and rear clamps, the user only needs to rotate the shoe toward left or right direction and cast a rotational force with the shoe cleat, whereby the front clamp and the rear clamp are pushed to resiliently open at the same time by the shoe cleat. The rotational angle herein needed for the shoe cleat to be disengaged is smaller than the rotational angle required for the shoe cleat of the known clipless pedal to be disengaged. Also, the disengagement of the shoe cleat herein is accelerated, providing greater security and longer reaction time period for the user in emergency.

Another objective provided by the present invention is that an adjusting screw member is provided to the rear clamp, and the adjusting screw has an adjusting plate thereon, such that the adjusting plate is able to axially move on the adjusting screw member along the adjusting screw member, such that the prestressed force of the resilient member through the movement of the adjusting plate, thereby moderating the tightness of the front clamp and the rear clamp.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 1:
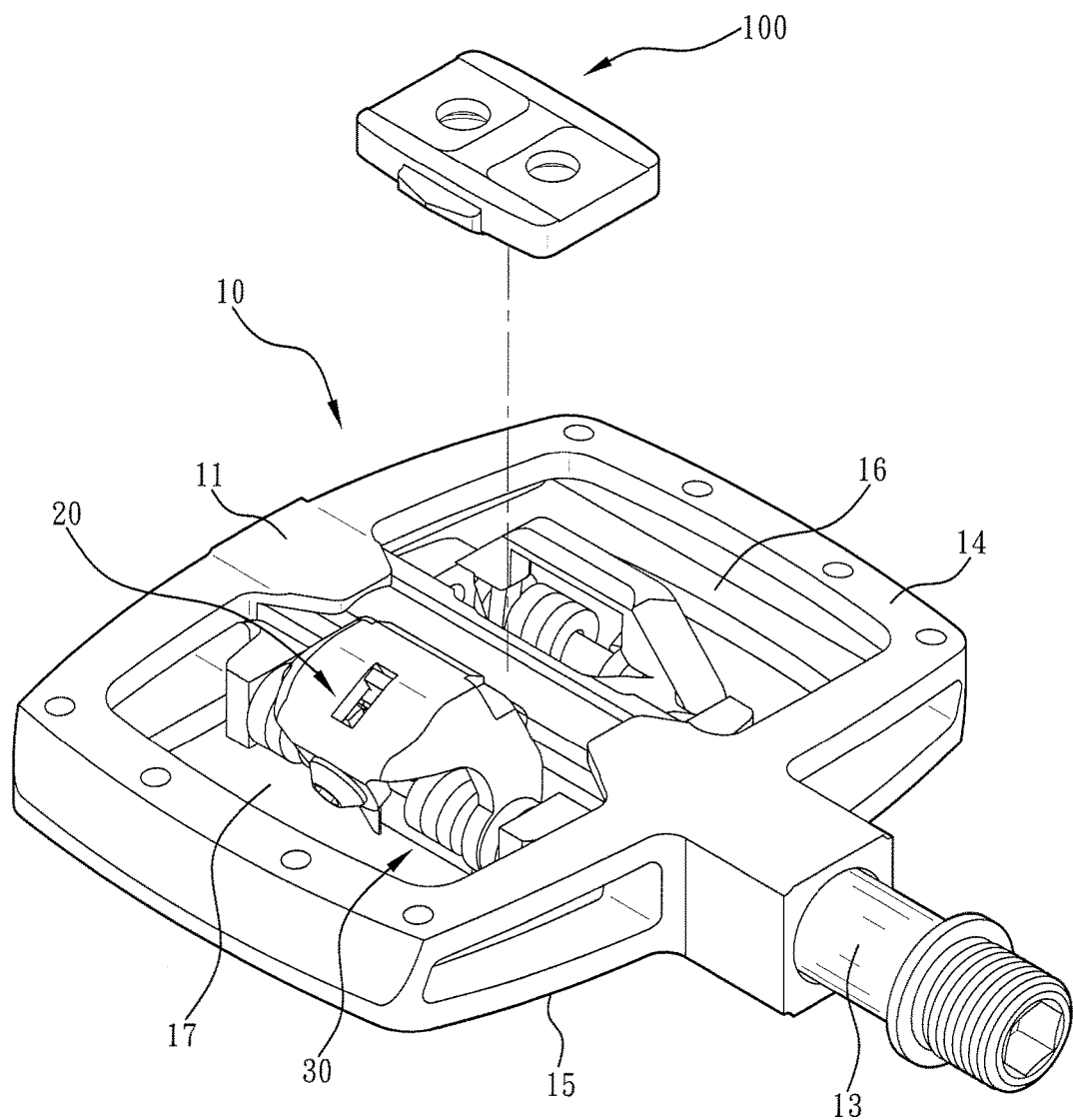
FIG. 1 is a perspective view of the double clamp clipless pedal in accordance with the present invention.
Figure 2:
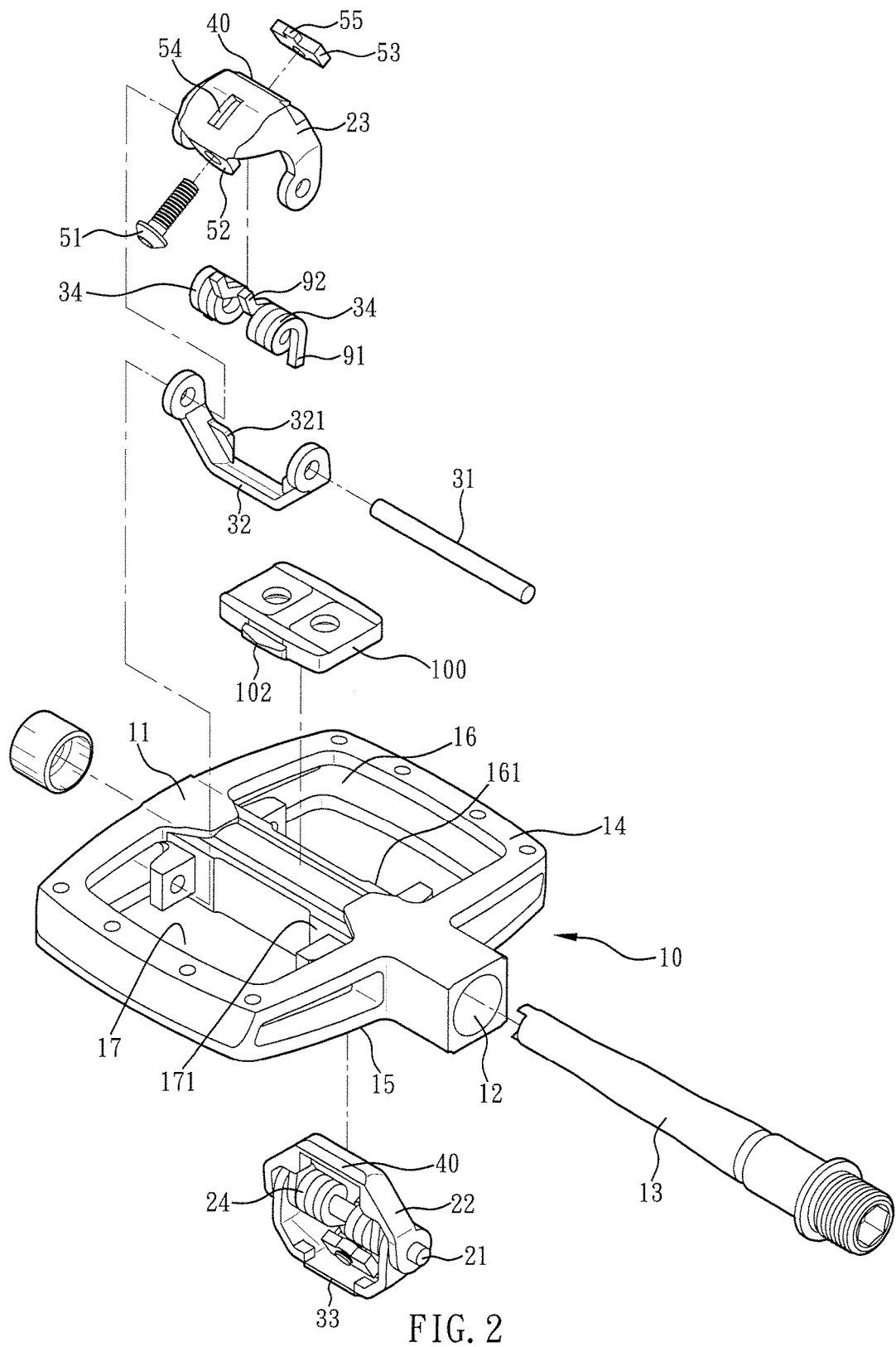
FIG. 2 is an exploded view of the double clamp clipless pedal in accordance with the present invention.
Figure 3:
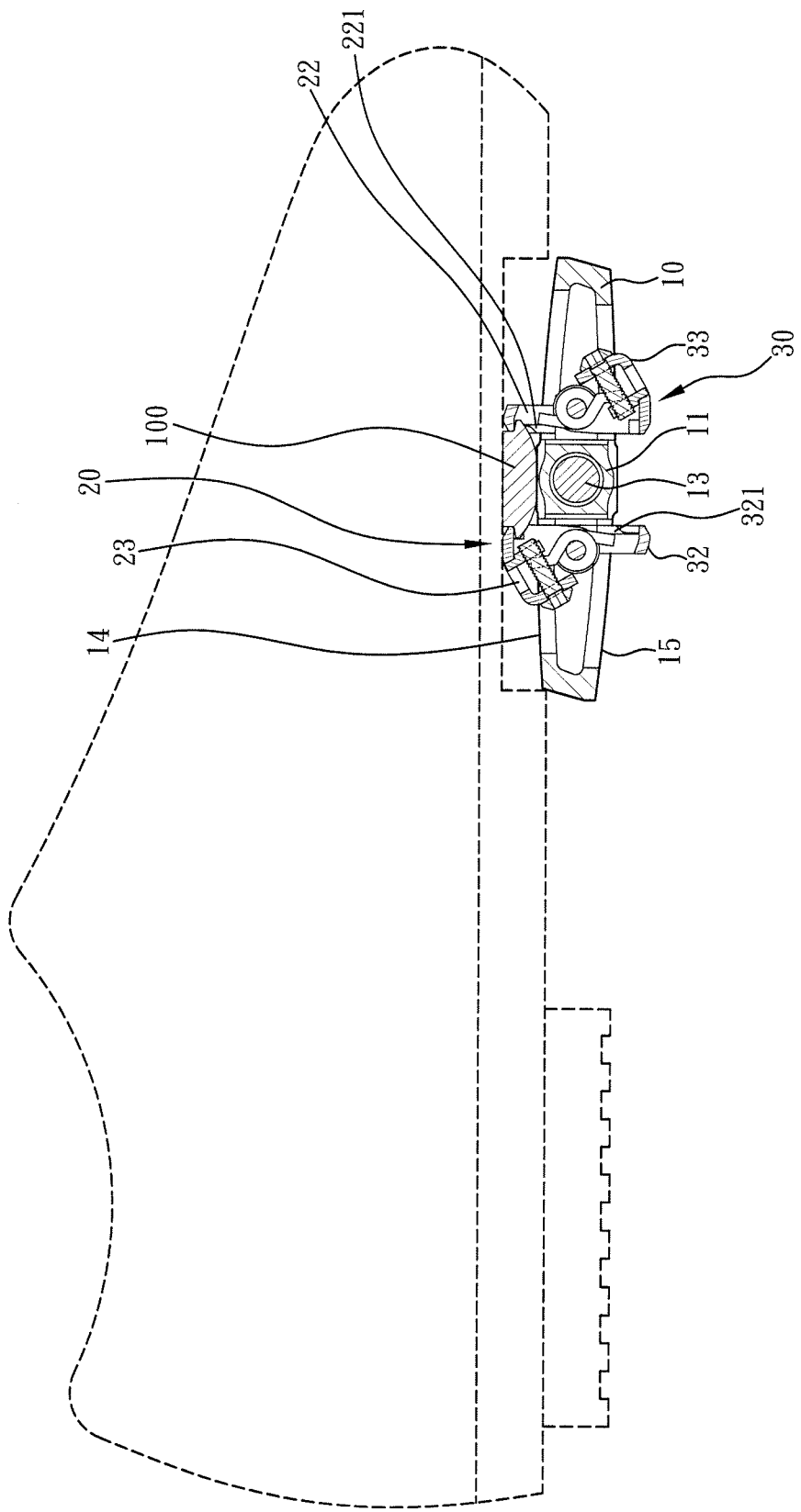
FIG. 3 is a first schematic view illustrating the shoe cleat clamped in the clamps from the fore end of the shoe cleat in accordance with the present invention.

Referring to FIG. 1 to FIG. 3, a double clamp clipless pedal is provided, comprising a pedal body 10, a first clamp assembly 20, and a second clamp assembly 30.

Figure 7:
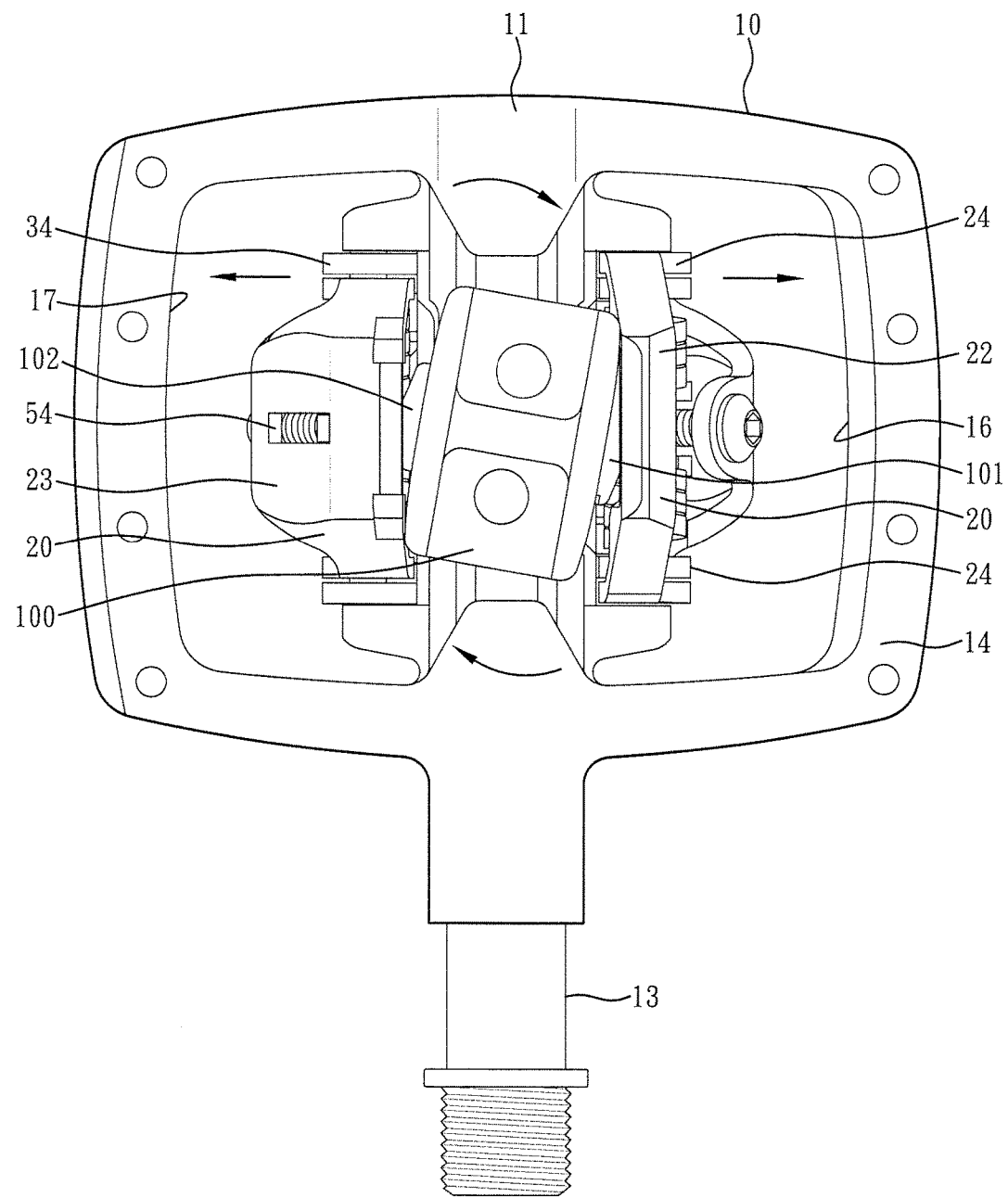
FIG. 7 is a schematic view illustrating the shoe cleat unclamped by the clamps in accordance with the present invention.

The pedal body 10 has a shaft portion 11 provided with a shaft bore 12 for a main shaft 13 to pass therethrough to be rotationally connected to an end of a crank (not shown in the drawings). The pedal body 10 has a first surface 14 and a second surface 15, wherein the pedal body 10 further has a first containing space 16 and a second containing space 17 disposed on two sides of the shaft portion 11, respectively. Furthermore, from a top viewpoint, the pedal body 10 is formed in an "8" shape (as shown in FIG. 7) or an "H" shape with a front end and rear end open (not shown in the drawings), so as to decrease the volume and weight of the pedal body 10.

The pedal body 10 is provided with a clamp assembly on at least one of the first surface 14 and the second surface 15. In the preferred embodiment, the clamp assembly includes a first clamp assembly 20 disposed on the first surface 14 and a second clamp assembly 30 disposed on the second surface 15. A rotational shaft 21, 31 is disposed in the first containing space 16 and the second containing space 17, respectively, and the rotational shafts 21, 31 are disposed in parallel to the main shaft 13. A front clamp 22 of a first clamp assembly 20 and a rear clamp 33 of a second clamp assembly 30 are mounted around the rotational shaft 21; a front clamp 32 of the second clamp assembly 30 and the rear clamp 23 of the first clamp assembly 20 are mounted around the rotational shaft 31. At least a resilient member 24 and a resilient member 34 are disposed between the front clamps 22, 32 and the corresponding rear clamps 33, 23 on the same rotational shaft 21, 31, respectively, whereby the front clamps 22, 32 and the rear clamps 23, 33 permanently rotate toward the main shaft. Also, a positioning face 161 and a positioning face 171 are disposed in the first containing space 16 and the second containing space 17 adjacent to the shaft portion 11, respectively, thereby positioning the front clamps 22, 32 and the rear clamps 23, 33, respectively. Also, a guiding slope 40 is disposed on one side of both the front clamps 22, 32 and the rear clamps 23, 33 adjacent to the main shaft 13, respectively.

Figure 4:
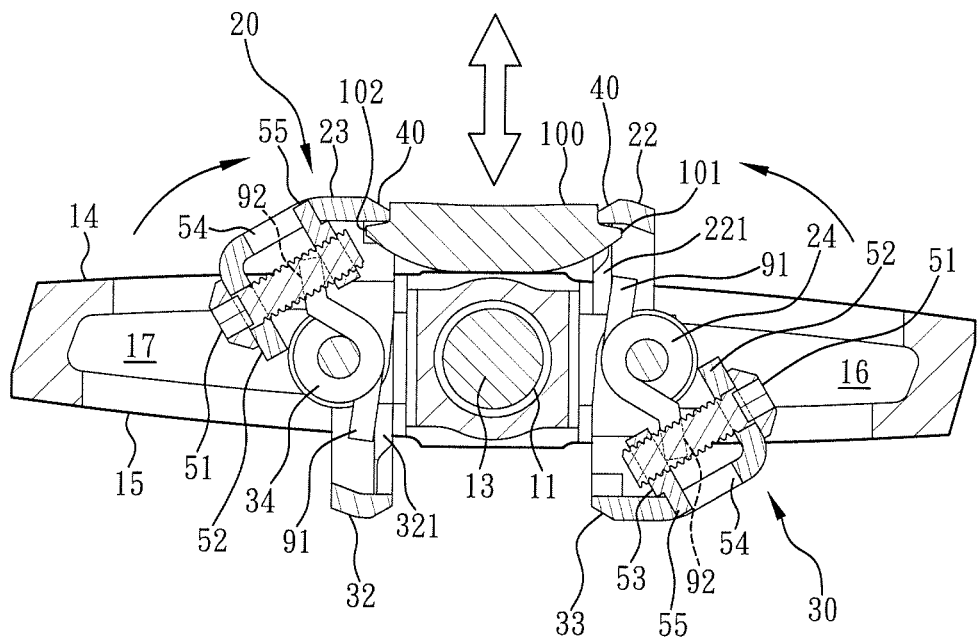
FIG. 4 is a schematic view illustrating the shoe cleat producing a vertical force.

Referring to FIG. 4, the front clamp 22 and the rear clamp 23 of the first clamp assembly 20 project from the first surface 14; the front clamp 32 and the rear clamp 33 of the second clamp assembly 30 project from the second surface 15.

Further, the resilient members 24, 34 are torsion springs having a first end 91 and a second end 92, wherein the first end 91 is engaged with the front clamps 32, 22, and the second end 92 are engaged with the rear clamps 23, 33 that are disposed on the same rotational shaft 31, 21 with the corresponding front clamps 32, 22, respectively. In the preferred embodiment, the resilient members 24, 34 are provided in an amount of two. Two retaining platelets 221, 321 are disposed on the inner side of the front clamps 22, 32, respectively (as shown in FIG. 2 and FIG. 3C), wherein the retaining platelets 221, 321 are engaged with the first end 91 of the resilient members 24, 34.

Figure 8:
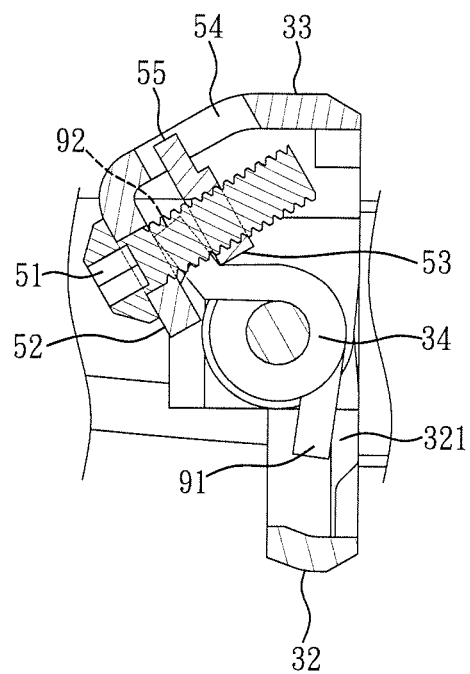
FIG. 8 is a schematic view illustrating the adjustment of the prestressed force of the resilient member in accordance with the present invention.

In addition, as shown in FIG. 2, FIG. 4, and FIG. 8, both the rear clamps 23, 33 have an adjusting seat 52, respectively, for installing an adjusting screw member 51 thereon. The adjusting screw member 51 is screwedly provided with an adjusting plate 53 and an adjusting groove 54 disposed in parallel to the adjusting screw member 51; also, the adjusting plate 53 is convexly provided with a sliding block 55 sliding disposed in the adjusting groove 54, whereby the adjusting plate 53 rotates with the adjusting screw member 51 and axially moves along the adjusting screw member 51. The second end 92 of the resilient members 24, 34 is engaged with the adjusting plate 53, respectively. With the movement of the adjusting plate 53, the prestressed force cast by the adjusting plate 53 on the resilient members 24, 34 is adjusted, efficiently moderating the tightness of the front clamps 22, 32 and the rear clamps 23, 33.

With the foregoing configuration, operation of the present invention will be illustrated below.

The front clamps 22, 32 and the rear clamps 23, 33 of each surface 14, 15 are force to resiliently and rotationally rotate to open and close, facilitating the engagement of a shoe cleat 100 between the front clamps 22, 32 and the rear clamps 23, 33, so as to meet different operating demands and increase the applicability of the present invention.

For example, the user is able to clamp the fore end 101 of the shoe cleat 100 on the bottom of a shoe by the front clamp 22. Due to an arc shape of the bottom face of the shoe cleat 100, when the rear end 102 of the shoe cleat 100 is pedaled onto the rear clamp 23, the bottom face of the shoe cleat 100 cooperates with the guiding slope 40, whereby the rear clamp 23 automatically rotates away from the shaft portion 11 to open. Upon the shoe cleat 100 entering between the front clamp 22 and the rear clamp 23, the rear clamp 23 is forced by the resilient force cast by the resilient member 34 to rotate toward the shaft portion 11 and closes, so as to hook the rear end 102 of the shoe cleat 100. In other words, the user is allowed to complete the engagement between the shoe and the pedal by pedaling to clamp the shoe cleat 100 from the fore end 101 thereof.

Alternatively, the user is also able to firstly clamp the rear end 102 of the shoe cleat 100 on the bottom of a shoe by the rear clamp 33, and cast a force to pedal and clamp the fore end 101 of the shoe cleat 100 by the front clamp 22. Also, the user is allowed to pedal the shoe cleat 100 directly, such that the front clamp 22 and the rear clamp 33 are forced to rotate away from the shaft portion 11 and open, thereby subsequently completing the engagement of the shoe cleat 100 and the pedal.

Referring to FIG. 3 to FIG. 4, when the shoe cleat 100 enters the position between the front clamp 22 and the rear clamp 33, with the effect of the resilient members 24, 34, the front clamp 22 and the rear clamp 33 permanently rotate toward the shaft portion 11 and close against each other. When the shoe cleat 100 cast a vertical force during the pedaling/rising movement of the user foot, the shoe cleat 100 resists the inner side of the front clamp 22 and the rear clamp 33, while the front clamp 22 and the rear clamp 33 remain unmoved and are stably fastened with the shoe cleat 100.

Figure 5:
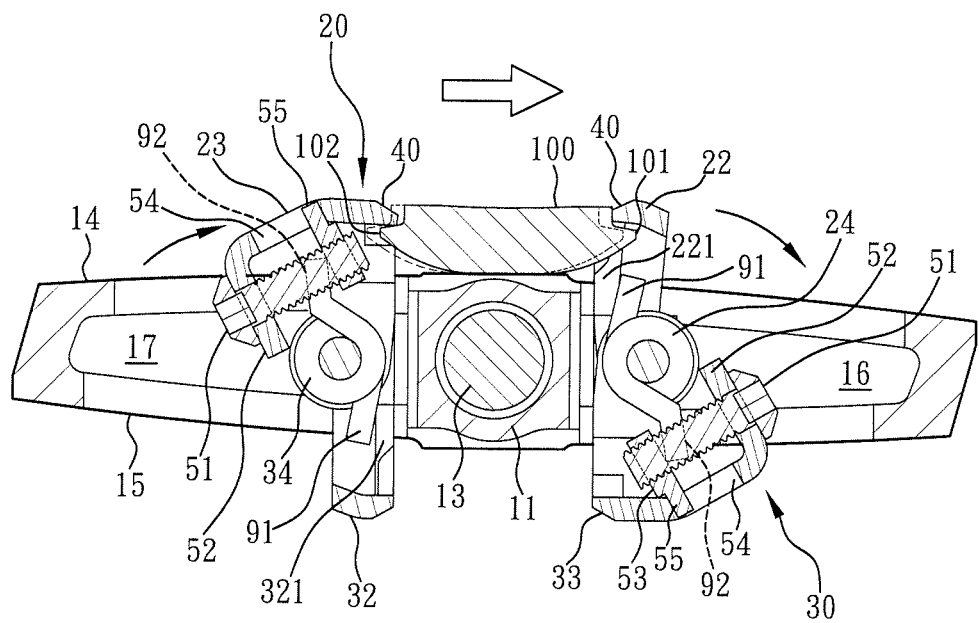
FIG. 5 is a schematic view illustrating the shoe cleat producing a horizontal forward force.

Referring to FIG. 5, when the shoe cleat 100 horizontally moves forward with the circling movement of the user foot and thereby generates a horizontally forward force, the front clamp 22 is pushed away from the shaft portion 11 by the shoe cleat 100 and opens; however, the rear clamp 23 automatically rotates toward the shaft portion 11 together with the movement of the shoe cleat 100 and closes, whereby the shoe cleat 100, the front clamp 22, and the rear clamp 23 remain in an engagement status.

Figure 6:
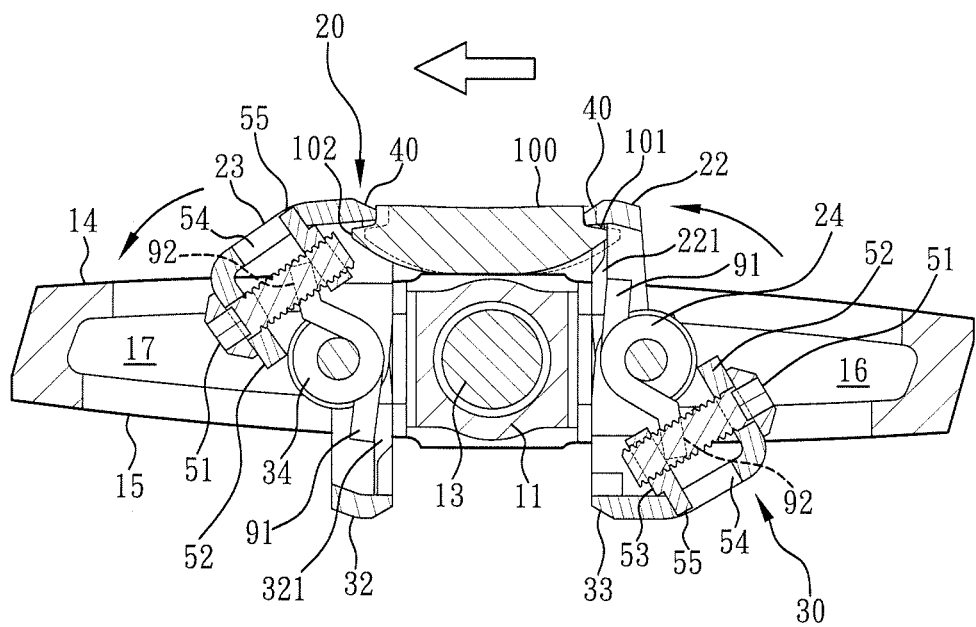
FIG. 6 is a schematic view illustrating the shoe cleat producing a horizontally backward force.

Based on the same structure, referring to FIG. 6, when the shoe cleat 100 horizontally moves with the circling movement of the user foot and thereby generates a horizontally backward force, the rear clamp 23 is pushed away from the shaft portion 11 by the shoe cleat 100 and opens; however, the front cleat 22 automatically rotates toward the shaft portion 11 together with the movement of the shoe cleat 100 and closes, whereby the shoe cleat 100, the front clamp 22, and the rear clamp 23 remain in an engagement status.

By use of the resilient members 24, 34, when the front clamps 22, 32 and the rear clamps 23, 33 engage the shoe cleat 100, a four-bar linkage mechanism is formed upon the pedal body 10. When the shoe cleat 100 is cast with a vertical force, the front clamps 22, 32 and the rear clamps 23, 33 are able to maintain the engagement status and prevented from loosened to disengage the shoe cleat 100. When the shoe cleat 100 is cast with a horizontal forward/backward force, the front clamps 22, 32 and the rear clamps 23 33 automatically move forward/backward together with the shoe cleat 100 movement whereby the front clamps 22, 32 and the rear clamps 23, 33 permanently engage the shoe cleat 100. As a result, the front clamps 22, 32 and the rear clamps 23, 33 are prevented from being accidentally opened due to the non-rotational force during the pedal circling movement of the user foot in the pedaling process.

Furthermore, because the front clamps 22, 32 and the rear clamps 23, 33 are able to automatically swing forward/backward to maintain the engagement status, a relatively small force is enough for the resilient members 24, 34 to achieve a stable fixing effect, instead of increasing the prestressed force of the spring to enhance the fixing effect. With such improvement, the shoe cleat 100 is provided with an advantage of being easily engaged by the front clamps 22, 32 and the rear clamps 23, 33 and at the same time prevented from easily disengaged, achieving a stable fixing effect.

Referring to FIG. 7, when the shoe cleat 100 is to be disclamped from the front clamp 22 and the rear clamp 23, the user only needs to rotate the shoe toward left direction or right direction, such that the front clamp 22 and the rear clamp 23 are pushed by the shoe cleat 100 to resiliently open. With the capability of the front clamp 22 and the rear clamp 23 being resiliently and rotationally open, the rotational angle needed for the shoe cleat 100 to be disengaged is smaller than the rotational angle required for the shoe cleat 100 of the known clipless pedal to be disengaged. Also, the disengagement of the shoe cleat 100 is accelerated, providing greater security and longer reaction time period for the user in emergency. Based on the same reason, the prestressed force of the spring does not need to be increased; therefore, the rotational force for the shoe cleat 100 to be disengaged does not need to be relatively large. In other words, when the shoe cleat 100 is cast with a correct rotational movement, the disengagement of the shoe cleat 100 is thereby achieved.

Also, the front clamps 22, 32 and the rear clamps 23, 33 are formed in a reversed "U" shape, and the fore end 101 and the rear end 102 of the shoe cleat 100 are formed in a slope edge. Therefore, when the shoe cleat 100 is rotated leftward or rightward, the front clamps 22, 32 and the rear clamps 23, 33 are pushed open and disengage the shoe cleat 100.

With the introduction above, skilled person in the field of the present invention is able to understand the technical difference between the present invention and the prior arts, such that the present invention meets the requirement of novelty. Also, the present invention achieves the effects unachievable by the prior arts, such that the present invention meets the requirement of inventive steps.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A double clamp clipless pedal, comprising:
a pedal body, having a first surface and a second surface, and provided with a main shaft passing through the pedal body to be rotationally connected to an end of a crank,
wherein a first clamp assembly protrudes from the first surface and a second clamp assembly protrudes from the second surface, each of the first and second clamp assemblies having a front clamp and a rear clamp disposed on two sides of the main shaft, respectively, the front clamp of the first clamp assembly and the rear clamp of the second clamp assembly co-axially mounted in the pedal body and including two resilient members, the front clamp of the second clamp assembly and the rear clamp of the first clamp assembly co-axially mounted in the pedal body and including two resilient members, such that the front clamps and the rear clamps permanently rotate toward the main shaft of the pedal body and are able to swing toward or away from the main shaft for engaging or disengaging a shoe cleat placed between one of the front clamps and one of the rear clamps that are disposed together on a same surface chosen from the first and second surfaces of the pedal body; each of the resilient members has a first end and a second end, and an inner side of each of the front clamps provided with two retaining platelets, such that the first end of each of the resilient members is engaged with one of the platelets of the corresponding front clamp, respectively, and the second end of each of the resilient members is engaged with the corresponding rear clamp; when the shoe cleat is engaged by the front clamp and the rear clamp that are disposed on the same surface of the pedal body, the front clamp and the rear clamp disposed on the same surface of the pedal body with the shoe cleat placed therebetween are allowed to swing together with the shoe cleat movement for maintaining an engagement between the shoe cleat and the front and rear clamps.

2. The clipless pedal of claim 1, wherein the front clamp of the first clamp assembly and the rear clamp of the second clamp assembly are mounted around one rotational shaft, and the front clamp of the second clamp assembly and the rear clamp of the first clamp assembly are mounted around another rotational shaft, wherein the rotational shafts are disposed in parallel to the main shaft.

3. The clipless pedal of claim 1, wherein the pedal body has a shaft portion, and the shaft portion is provided with a shaft bore for the main shaft to pass therethrough.

4. The clipless pedal of claim 3, wherein the pedal body has a first containing space and a second containing space disposed on two sides of the shaft portion for containing the first clamp assembly and the second clamp assembly, respectively.

5. The clipless pedal of claim 4, wherein a positioning face is disposed in the first containing space and the second containing space adjacent to the shaft portion, respectively, so as to position the front clamps and the rear clamps, respectively.

6. The clipless pedal of claim 1, wherein each of the resilient member is a torsion spring.

7. The clipless pedal of claim 1, wherein each rear clamp is provided with an adjusting screw member, and each adjusting screw member has an adjusting plate, such that the each adjusting plate axially moves on the adjusting screw member along a central axis of a respective one of the adjusting screw members, and the second end of each of the resilient members is engaged with the corresponding adjusting plate; each rear clamp is provided with an adjusting seat for installing the adjusting screw member thereon, each rear clamp is also provided with an adjusting groove disposed along a direction in parallel to the central axis of the adjusting screw member, and each adjusting groove is convexly provided with a sliding block which is sliding disposed in the adjusting groove.

8. The clipless pedal of claim 1, wherein a guiding slope is disposed on one side of both the front clamp and the corresponding rear clamp adjacent to the main shaft, respectively.

9. A double clamp clipless pedal, comprising:
a pedal body, having a first surface and a second surface, and provided with a main shaft passing through the pedal body to be rotationally connected to an end of a crank,
wherein a first clamp assembly protrudes from the first surface and a second clamp assembly protrudes from the second surface, each of the first and second clamp assemblies having a front clamp and a rear clamp disposed on two sides of the main shaft, respectively, the front clamp of the first clamp assembly and the rear clamp of the second clamp assembly co-axially mounted in the pedal body and including two resilient members, the front clamp of the second clamp assembly and the rear clamp of the first clamp assembly co-axially mounted in the pedal body and including two resilient members, such that the front clamps and the rear clamps permanently rotate toward the main shaft of the pedal body and are able to swing toward or away from the main shaft for engaging or disengaging a shoe cleat placed between one of the front clamps and one of the rear clamps that are disposed together on a same surface chosen from the first and second surfaces of the pedal body; each of the resilient members has a first end and a second end, such that the first end of each of the resilient members is engaged with the corresponding front clamp, and the second end of each of the resilient members is engaged with the corresponding rear clamp; each of the rear clamps is provided with an adjusting screw member, and each adjusting screw member has an adjusting plate, each adjusting plate axially moving on the adjusting screw member along a central axis of a respective one of the adjusting screw members, and the second end of each of the resilient members is engaged with the corresponding adjusting plate; when the shoe cleat is engaged by the front clamp and the rear clamp that are disposed on the same surface of the pedal body, the front clamp and the rear clamp disposed on the same surface of the pedal body with the shoe cleat placed therebetween are allowed to swing together with the shoe cleat movement for maintaining an engagement between the shoe cleat and the front and rear clamps.

10. The clipless pedal of claim 9, wherein each of the rear clamps is provided with an adjusting seat for installing the adjusting screw member thereon, and each rear clamp is also provided with an adjusting groove disposed along a direction in parallel to the central axis of the adjusting screw member, and each adjusting groove is convexly provided with a sliding block which is slidably disposed in the adjusting groove.

* * * * *